US007031991B2

(12) United States Patent
Hars

(10) Patent No.: US 7,031,991 B2
(45) Date of Patent: Apr. 18, 2006

(54) HADAMARD-TRANSFORM ON-LINE RANDOMNESS TEST

(75) Inventor: Laszlo Hars, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 721 days.

(21) Appl. No.: 10/124,034

(22) Filed: Apr. 17, 2002

(65) Prior Publication Data

US 2003/0200238 A1    Oct. 23, 2003

(51) Int. Cl.
G06F 1/02    (2006.01)

(52) U.S. Cl. .................................. 708/250; 708/255

(58) Field of Classification Search ......... 708/250–256
See application file for complete search history.

(56) References Cited

U.S. PATENT DOCUMENTS

| 4,685,132 A | * | 8/1987 | Bishop et al. ............... 708/250 |
| 5,675,649 A | * | 10/1997 | Brennan et al. ............ 708/250 |
| 6,650,687 B1 | * | 11/2003 | McDonough ............... 708/250 |

OTHER PUBLICATIONS

Ashish et al., Novel spectral methods for built-in self-test in a system-on-a-chip environment, 2001, IEEE, pp. 163-168.*
Ling et al., Fast acquisition scheme and implementation of PRACH in WCDMA system, 2001, IEEE, pp. 1701-1705.*
Knuth, The art of computer programming: empirical tests, 2000, Art of computer programming, pp. 61-75.*
"Efficient Online Tests for True Random Number Generators", by Werner Schindler, XP-001061161, 2001, pp. 103-117.
"Advances in Cryptology Lectures in Computer Science", by Frank A. Feldman, XP-001154220, Sep. 16, 1987, pp. 243-254.

* cited by examiner

Primary Examiner—Kakali Chaki
Assistant Examiner—Chat C. Do
(74) Attorney, Agent, or Firm—Adam L. Stroud

(57) ABSTRACT

The present invention is a method and apparatus for testing random numbers generated by a random-number generator in real time. A stream of random bits generated by the random-number generator is converted into ±1 binary bits and segmented into a predefined block of vector bits, then these vectorss undergo a Hadamard-transform calculation. The Hadamard-transform output values are counted in each of a predetermined range of values and applied to an exponential frequency calculation to compute and update an average number of times that each output of the Hadamard-transforms falls into the corresponding predetermined range of values for a predetermined time period. The updated frequency values are compared to at least one predetermined acceptance range, so that if at least one of the updated frequency values repeatedly falls outside the predetermined acceptance range more than a predetermined number of times, it is determined that the generated random bits are insufficiently random.

22 Claims, 3 Drawing Sheets

$$H_4 = \begin{pmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{pmatrix}$$

$$H_4 \cdot (1 \; -1 \; -1 \; 1 \; 1 \; -1 \; -1 \; 1 \; 1 \; 1 \; 1 \; -1 \; -1 \; 1 \; 1 \; 1)^T$$

HADAMARD-TRANSFORM ON-LINE RANDOMNESS TEST

BACKGROUND OF THE INVENTION

1. Field of the Invention

The present invention pertains to the field of random-number generators and, in particular, to evaluating whether the random numbers generated by a random-number generator are sufficiently random.

2. Description of the Related Art

A truly random sequence is difficult to generate in real application. For example, heat is typically generated in the hardware component of a random-number generator when the random-number generator generates a series of 1's and 0's over a time period. In some situations generating a 1 bit could consume more power than generating a 0 bit. When a long sequence of 1 bits is generated, the electrical circuit of the random generator tends to become hot. Thus, if the circuit generates a 1 bit when it is hot, the circuit will "latch up." As a result, the circuit will generate mostly 1 bits but rarely a 0 bit. The fore-mentioned biased 0/1 frequency error will have catastrophic consequences if the random numbers are used in security-sensitive applications.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to perform in real time as they require a great amount of computational processing power.

SUMMARY OF THE INVENTION

The present invention overcomes the above-described problems, and provides additional advantages by providing a method and apparatus for providing an on-line randomness test to ensure that the generated random numbers are sufficiently random.

According to an aspect of the invention, a method of testing the randomness of a stream of random numbers is provided. The method includes the steps of: providing a continuous stream of random binary bits; applying a predefined block of the random binary bits to a Hadamard-transform calculation; applying the output of the Hadamard-transform calculation to an exponential-frequency calculation (Z) to compute and update an average number of times that the output of the Hadamard transform falls within a predetermined range of values over a predetermined time period; and, determining whether the generated random binary bits are sufficiently random by comparing the output of the exponential-frequency calculation (Z) to a predetermined acceptance range, wherein the exponential-frequency calculation (Z) is performed according to the following steps: assigning an array of accumulators having the predetermined range of values to output of the Hadamard-transform calculation; and, counting the number of times that the output of each the Hadamard-transform falls in the corresponding the predetermined range of values for the predetermined time period.

According to another aspect of the invention, a method for testing the randomness of a stream of random numbers includes the steps of: (a) generating a continuous stream of random binary bits; (b) applying a predefined block of the random binary bits to a Hadamard-transform calculation; (c) assigning an array of accumulators having a predetermined range of values to each output of the Hadamard-transform calculation to count a number of times that each output of the Hadamard-transform calculation falls into one of the predetermined range of values in the respective the accumulator; (d) applying the values of the array of accumulators to an exponential-frequency calculation (Z) to update the average number of times that each output of the Hadamard-transform calculation falls into one of the predetermined range of values in the respective the accumulator over a predetermined time period; and, (e) comparing the output of the exponential-frequency calculation (Z) to a predetermined acceptance range.

In the embodiment, the exponential-frequency calculation (Z) is updated according to the following equation: $Z_{new} = \alpha \cdot Z_{old} + h(t)$, wherein $\alpha$ falls between 0 and 1 ($0 < \alpha < 1$), $Z_{old}$ is initially assigned by an operator; and, $h(t)$ represents the number of times that the output of the Hadamard-transform falls into the corresponding the predetermined range of values during the predetermined time period. In addition, the predetermined acceptance range is obtained through a simulation.

According to yet another aspect of the invention, the generated random bits are deemed insufficiently random when any output of the exponential-frequency calculation repeatedly falls outside the predetermined acceptance range more than a predefined number of times. In such event, a new set of random bits may be generated, or the generated random bits may be denied for a subsequent application.

According to a further aspect of the invention, a system for testing randomness in provided. The system includes a random-number generator for generating a random sequence comprising binary bits; a detector for detecting whether the generated random sequence is sufficiently random based on an exponential frequency operation; and, a switch for controlling the flow of the generated random sequences for a subsequent application based on the outcome of the exponential-frequency operation, wherein a predefined block of the random binary bits undergoes a Hadamard-transform calculation and thereafter undergoes an exponential frequency calculation (Z) to update an average number of times that each output of the Hadamard-transform calculation falls into one of predetermined range of values over a predetermined time period and wherein, if any output of the exponential-frequency calculation outputs repeatedly falls outside a predetermined acceptance range more than a predefined number of times, determining that the generated random sequences are insufficiently random. The apparatus further includes means for transmitting an alarm signal that the generated random sequences are insufficiently random when any output of the exponential-frequency calculation outputs repeatedly falls outside the predetermined acceptance range more than the predefined number of times, and means for generating a new set of random bits when any output of the exponential-frequency calculation outputs repeatedly falls outside the predetermined acceptance range more than the predefined number of times.

Yet another aspect is that the present invention may be implemented in hardware, software, or a combination of hardware and software as desired for a particular application.

Furthermore, the present invention may be realized in a simple, reliable, and inexpensive implementation.

These and other advantages will become apparent to those skilled in this art upon reading the following detailed description in conjunction with the accompanying drawings.

BRIEF DESCRIPTION OF DRAWINGS

FIG. 2 shows a diagram how the Hadamard transform is performed on a sequence of random numbers according to an embodiment of the present invention; and, FIG. 3 is a flow chart illustrating the operation steps of testing the statistics of the generated random numbers according to an embodiment of the present invention.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
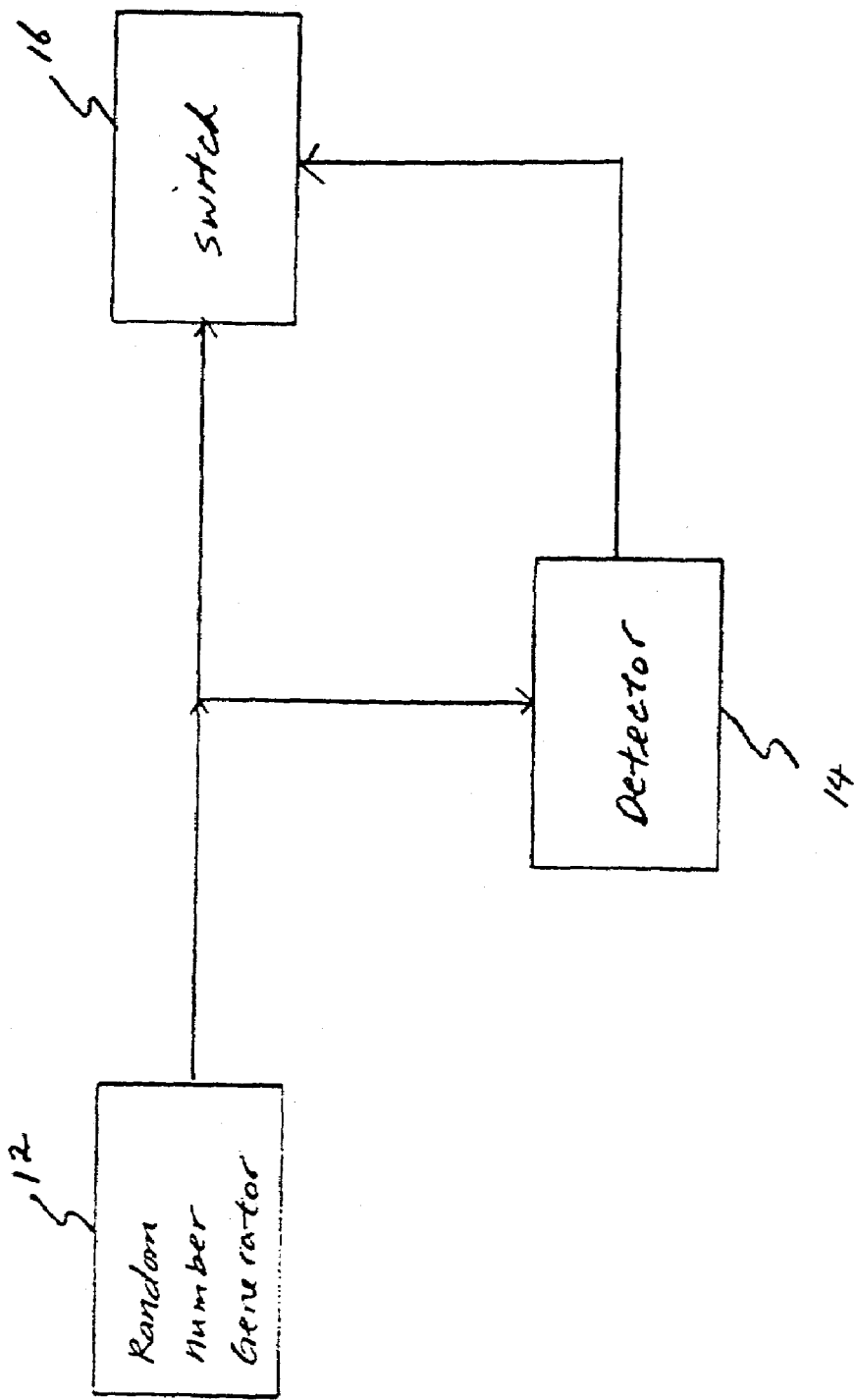
FIG. 1 illustrates a simplified block diagram of the random-number-generating module according to an embodiment of the present invention.

FIG. 1 illustrates a simplified block diagram of a random-number-generating system 10 according to an exemplary embodiment of the present invention. The system 10 includes a random-number generator (RG) 12 for generating a series of random numbers, a detector 14, and a switch 16. The RG 12 in this disclosure means any device that produces a signal that can be converted into a sequence of binary bits or any other form that includes the desired randomness in any conventional or unconventional manner. The detector 14 detects whether the generated random numbers are truly random sequences according to predetermined criteria (explained later). The switch 16 may represent an input to a cryptography system, an audio or video noise generator, a computer program, or other devices and processes.

In operation, as the random numbers are generated by the random-number generator 12, the detector 14 detects whether the generated random numbers form a sufficiently random sequence. If they are determined to be sufficiently random within a specifically acceptable range, the switch 16 allows the generated random numbers to be forwarded to any suitable subsequent applications, such as any circuit, system, process, gambling application, simulation, statistical sampling, the Diffie-Hellman key exchange, or the like, which uses the random numbers supplied by the RG 12. If the generated random numbers are deemed insufficiently random according to predetermined criteria (explained later), the switch 16 may stop the flow of the generated random numbers when the generated random numbers are deemed insufficiently random by the detector 14. Alternatively, a new set of random numbers may be generated by the random-number generator 12 if the generated random sequence is determined to be insufficiently random.

Now, a description will be made in detail in regards to determining whether the generated random numbers are sufficiently random with reference to FIGS. 2 and 3.

As background information, it is well known in the art that for any power of 2, a set of n orthogonal-binary sequences, each the length n, can be constructed. In fact, orthogonal-binary sequence sets are known for most lengths, which are multiples of four and less than two hundred. One class of such orthogonal-binary sequences that are useful for orthogonal codes, and are also relatively easy to generate, is called Walsh functions. Walsh functions are derived from Walsh-function matrices, also known as Hadamard matrices. The rows of a Hadamard matrix can be viewed as ±1 approximations of sine waves; therefore, the multiplication with a Hadamard matrix (sometimes referred as the Walsh transform) is a binary variant of the Discrete-Fourier Transform.

Referring to FIG. 2, as a stream of random numbers is generated by the RG 12 the generated random numbers are first converted to binary ±1 bits and then segmented into blocks of predetermined size, n, to form a sequence of vectors, V. Each vector V of n bits is multiplied to the Hadamard matrix of size (n×n) on a continuing basis for calculating the correlation of its rows to the vector. It should be noted that a block of n=16 bits as the length of the vectors V is described for illustrative purposes; however, it should be understood that the present invention can support any power of 2 vector length, which is also the length of the rows of the Hadamard matrix. Thus, the grouping of 16 bits in a single vector in the drawing should not impose limitations on the scope of the invention.

The (normalized) Hadamard-matrix $H_n$ of size $2^n$ is defined in the following recursive way:

$$H_0 = [1], \quad H_{n+1} = \begin{bmatrix} H_n & H_n \\ H_n & -H_n \end{bmatrix},$$

wherein the first row of every $H_n$ is all 1's, and all other rows consist of equal number of +1 and −1 entries. The Hadamard matrices are orthogonal, that is $H_n \times H_n' = H_n' \times H_n = 2^n \cdot I_{2^n}$, where $I_{2^n}$ denotes the identity matrix of size $2^n$. Here, the rows and columns are pair-wise orthogonal. From the definition of the normalized Hadamard matrix we get the following recursion:

$$H_{n+1} \cdot (v_1 v_2 \ldots v_{2^{n-1}}, v_{2^{n-1}+1} \ldots v_{2^n})^T =$$

$$\begin{bmatrix} H_n \cdot (v_1 v_2 \ldots v_{2^{n-1}})^T + H_n \cdot (v_{2^{n-1}+1} \ldots v_{2^n})^T \\ H_n \cdot (v_1 v_2 \ldots v_{2^{n-1}})^T - H_n \cdot (v_{2^{n-1}+1} \ldots v_{2^n})^T \end{bmatrix}.$$

As shown in FIG. 2, the Hadamard matrix is multiplied by the (transpose of v to obtain the values of the Hadamard transformed sequences, w. Stated otherwise, $w = (h_1, h_2, \ldots, h_{2^n})^T = H_n \times v$. If all entries of v is +1, $h_1 = 2^n$ and all other $h_i = 0$. If one entry of v is flipped to −1, than all $h_i$ are changed by 2. Consequently, all $h_i \equiv 2 \mod 4$ or all $h_i \equiv 0 \mod 4$, dependent on if v had an odd or even number of −1 entries.

After undergoing the Hadamard transform, the number of times the possible values of the Hadamard-transform entries in w are counted in an array of accumulators to obtain an average number of times that each possible value in the vector, w, appears over a time period. To reduce the number of accumulators used, more than one possible value may be counted in a single accumulator. That is, an accumulator is provided for each possible value of the vector, w, entries, such that each time a new block of bits is generated and applied to the Hadamard transform, a number of times that the Hadmard transform output falls within the range of each accumulator is counted. Thus, the accumulator serves to provide a histogram, h(t), which is indicative of the average number of times that each possible of vector, w, occurs during a given period.

Note that as the present invention is applicable in real time to test the random sequence, the accumulators must be constantly updated. As such, the old frequency values must have a diminishing or no effect. That is, the test to evaluate the statistical quality of the random sequence runs continuously, thus the accumulators must be cleared periodically to avoid overflow. There are various counting methods, which can be implemented in accordance with the techniques of the present invention; however, exponential averaging is preferably used during the frequency-counting operation, as described below.

During the exponential averaging operation, as the accumulator updates an average number of occurrences or frequency of each transform value-range in w, each time n random bits are generated, a factor, $\alpha$, which falls between 0 and 1 ($0<\alpha<1$), is multiplied to the accumulator, then added to the current value, h(t), in the accumulator: $Z_{new}=\alpha \cdot Z_{old}+h(t)$, wherein the initial exponential-average value, $Z_{old}$, is first initialized by the operator. To have useful averaging effects, the value for $\alpha$ is selected to be close to 1, $\alpha=1-1/N$, $N>>1$. In this case, $\log \alpha \approx -1/N$ and the half-life of the averaged values is $k \approx N \cdot \log 2 \approx 0.30103 \cdot N$. After N steps, the weight of the oldest averaged value becomes $(1-1/N)^N \approx 1/e \approx 0.367879$. Here, e is the basis of the natural logarithm (the Euler constant), so the term, N, becomes the natural life of a bit. If all averaged values are 1's, the accumulator value is $1+\alpha+\alpha^2+ \ldots =1/(1-\alpha)=N$, whereas if all averaged values are 0's the accumulator value is 0. Note that the expected value of the exponential average is the exponential average of the expected values of the individual values. If the averaged values are uniformly distributed binary bits, the expected value of the exponential average is: $\frac{1}{2}+\frac{1}{2}\alpha+\frac{1}{2}\alpha^2+ \ldots =N/2$.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of each exponential averaging is compared to a predetermined acceptance range. If the value of any accumulator falls out of the predetermined range during the exponential-averaging counting, it is inferred that the generated random numbers would be insufficiently random according to the embodiment of the present invention. Here, a threshold value may be set to notify the user when the test fails repeatedly.

The exact boundary of the acceptance can be adjusted selectively based on the data obtained from extensive simulations with a known, good source of random numbers, in which an ideal histogram distribution can be obtained. Such random sequences are commercially available and can be downloaded, for example, from various web sources, including "www.fourmilab.ch/hotbits" and "lavarand.sgi.com." Thus, the actual range used in the test is set selectively by an operator so that a choice can be made among different sensibilities as to whether the generated random sequence is deemed sufficiently random. In an alternate embodiment, a different acceptance range can be assigned to each accumulator.

Figure 3:
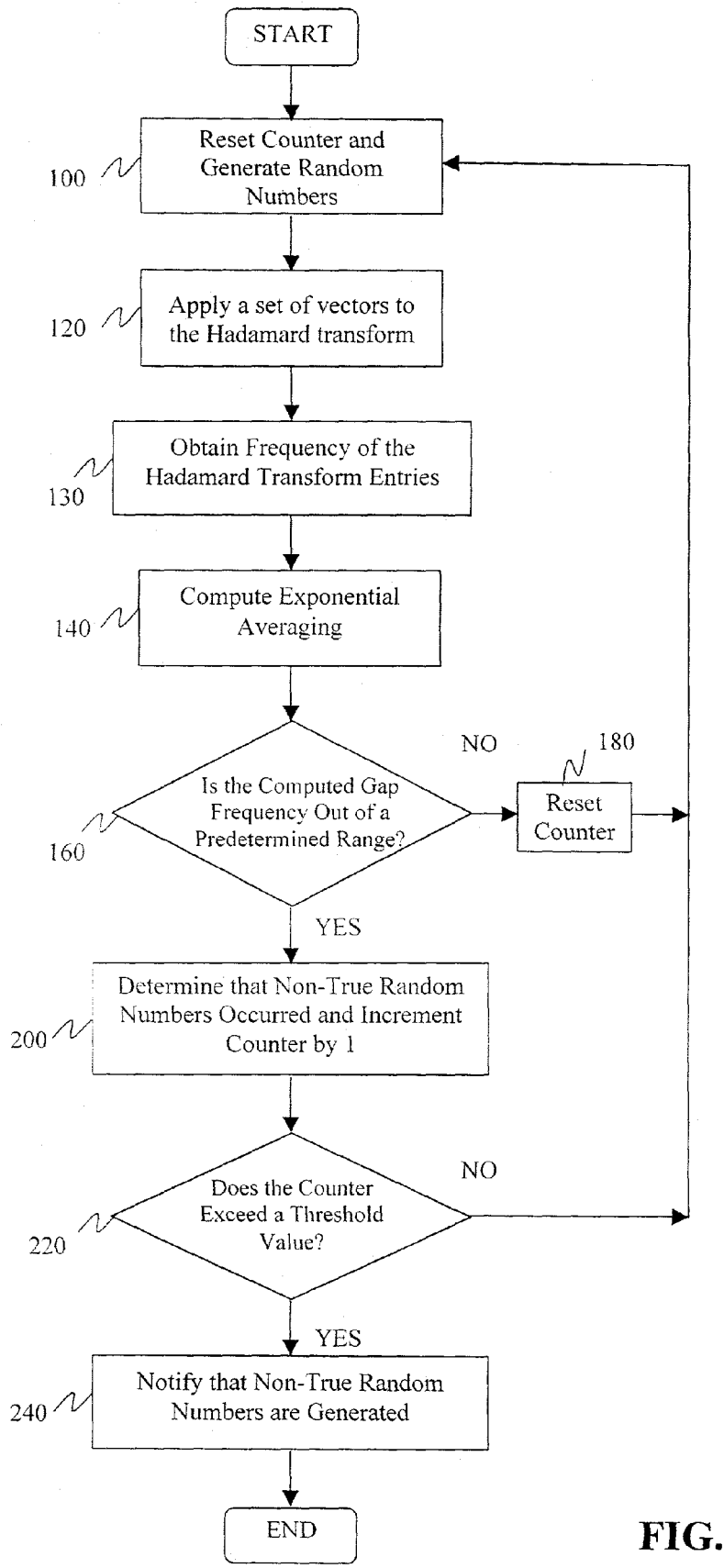

FIG. 3 is a flow chart illustrating the operation steps for testing the statistical quality of the random sequence in accordance with the present invention. The rectangular elements indicate computer-software instruction, whereas the diamond-shaped element represents computer-software instructions that affect the execution of the computer-software instructions represented by the rectangular blocks. Alternatively, the processing and decision blocks represent steps performed by functionally-equivalent circuits such as a digital-signal-processor circuit or an application-specific-integrated circuit (ASIC). It should be noted that many routine program elements are not shown, such as initialization of loops and variables and the use of temporary variables. It will be appreciated by those of ordinary skill in the art that unless otherwise indicated herein, the particular sequence of steps described is illustrative only and can be varied without departing from the spirit of the invention.

As shown in FIG. 3, the randomness test is initiated upon generating a continuous stream of random binary bits by the random-number generator 12 in step 100. At the same time, the counter is reset. In step 120, the generated random numbers are segmented into a set of vectors of signed bits and multiplied to the Hadamard matrix to obtain the Hadamard-transform coefficients vectors, w. Then, an array of pre-initialized accumulators is applied to the histogram vectors, h(t), to perform a frequency test, in which a frequency of each value-range in the vectors, w, is calculated in order to generate an average histogram vector in step 130. Thereafter, the histogram vectors are updated in each accumulator using an exponential averaging operation in step 140. During updating mode, all the previous exponential-frequency values are reduced by a factor $\alpha$ ($0<\alpha<1$), such that the old frequency values will have a diminishing effect. After undergoing the exponential averaging operation, the updated frequency values are compared to a predetermined acceptance range or respective predetermined acceptance ranges in step 160. If any of the values in each accumulator A is outside the predetermined acceptance range, it is determined that non-random patterns have been detected in step 200, and the counter is increased by 1. Otherwise, the counter is reset in step 180 and returns to step 100 of processing random numbers. In step 220, if the value of the counter is greater than a threshold value, a notification is transmitted in step 240 that the generated random numbers are not sufficiently random. Alternatively, the switch 16 can be deactivated to stop the flow of the random numbers for a subsequent application. Then, the generated random numbers can be discarded, and the whole process of generating new random numbers can be initiated. If the value of the counter does not exceed the threshold value in step 220, the process of generating random numbers is repeated.

The various steps described above may be implemented by programming them into functions incorporated within application programs, and programmers of ordinary skill in the field can implement them using customary programming techniques in languages, such as C, Visual Basic, Java, Pel, C++, and the like. In an exemplary embodiment, the method described in FIG. 3 may be constructed as follows (using the C programming language). For simplicity we implemented the test using floating-point arithmetic.

APPENDIX

MS Visual C code

```
/****************************************************************\
 * Hadamard.c
 *   Hadamard <#transformations> <bit generator type> <bit generator param>
 *   Generate test bits
 *   Calculate Fast Hadamard Transform of Length 256
 *       Check coefficients
 *   Prints test statistics
 *
 * Hadamard 1e5 0 0.5
 * Hadamard test passed
 *
 * Hadamard 1e5 0 0.499
 * #Hadamard coeffs = 8 is out of range at trafo 58425 (11803.4 [11283.6,11803.4])
 *
 * Hadamard 1e4 2 8 0 1 255 [ all 8 bit words ]
 * #Hadamard coeffs = 0 is out of range at trafo 2 (6889.31 [6313.6,6744.1])
 *
 * Hadamard 1e4 2 6 0 1 63
 * #Hadamard coeffs = 2 is out of range at trafo 18 (13253.3 [12695.9,13232.6])
 *
 * Vers. 1.0 04/25/01: Created by Laszlo Hars
 *
\****************************************************************/
#include <stdio.h>
#include <stdlib.h>
#define HN         16
#define HDLOG      8
#define HDLEN      (1<<HDLOG)
// Multiplyer = 1-½^8
#define W          0.99609375
// move MS L bits up by 1 position. HW implementation is just switch over bus lines
#define MAP(L,x)   (((MS[L]&x)<<1)+(LS[L]&x))
#define ABS(A)     ((A) < 0 ?-(A) : (A))
// External function prototypes
void BitGenInit( int argc, char *argv[ ]);
unsigned int NextBit( );
int main (int argc, char *argv[ ])
{
  int i, j, k, L, n = (int)atof(argv[1]), s, tr,
      H[HN], LS[HDLOG], MS[HDLOG], t[HDLEN];
  double   Z[HN] = {6525.0,12961.0,12656.0,12163.0,11540.0,10758.0, 9825.0, 8927.9,
                    7933.7, 6949.4, 5980.4, 5079.3, 4249.0, 3504.1, 2827.2, 5192.0},
           Y[HN] = {6313.6,12695.9,12373.5,11865.0,11283.6,10475.4, 9530.6, 8680.5,
                    7702.1, 6720.3, 5763.1, 4881.1, 4072.0, 3348.1, 2682.0, 5065.9},
           X[HN] = {6744.1,13232.6,12945.1,12468.8,11803.4,11049.9,10128.6, 9182.5,
                    8172.4, 7186.4, 6206.1, 5285.7, 4433.8, 3667.5, 2980.4, 5321.3};
  if( argc < 4) {
    printf("Usage: Hadamard <#transformations> <bit generator type> <bit generator params . . . >\n");
    putchar('\a');                // rings the bell
    exit(1); }
  BitGenInit(argc, argv);
  for(k = 0; k < HDLOG; ++k) {    // Initialize remap masks
    MS[k] = -1 << k;
    LS[k] = ~MS[k]; }
  for(tr = 0; tr < n; ++tr) {     // repeat the transformation steps
    for(k = 0; k < HDLEN; ++k)
      t[k] = 2*NextBit( ) - 1;    // Random bits -> +/- 1
    for(L = 0; L < HDLOG; ++L) {  // Fast Hadamard Transformation
      for(i = 0; i < HDLEN/2; ++i) {
        j = MAP(L,i);
        k = j + (1<<L);
        s = t[k];
        t[k] = t[j] - s;
        t[j] = t[j] + s;
      }
    }                             // end Fast Hadamard
    for(k = 0; k < HN; ++k)
      H[k] = 0;                   // clear histogram bins
    for(k = 0; k < HDLEN; ++k) {
      s = ABS(t[k]) >> 1;
      if (s >= HN) S = HN-1;
      H[s]++;                     // calculate histograms
    }
    s = (t[0] & 3) != 0;          // nonzero Hadamard entries 0,4,8 . . . or 2,6,10 . . .
    for(k = s; k < HN; k += 2) {
      Z[k] = Z[k]*W + H[k];       // exponential average of #entries = 2*k
      if( Z[k] < Y[k] || Z[k] > X[k] ) {
```

APPENDIX-continued

MS Visual C code

```
            printf("#Hadamard coeffs = %d is out of range at trafo %d (%g [%g,%g])\n",
                2*k, tr+1, Z[k], Y[k],X[k]);
            exit(2); }
        }
    }
    printf("Hadamard test passed\n");
}
```

While the preferred embodiments of the present invention have been illustrated and described, it will be understood by those skilled in the art that various changes and modifications may be made and equivalents substituted for elements thereof without departing from the true scope of the present invention. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling without the scope of the appended claims.

What is claimed is:

1. A method for testing the randomness of a stream of random numbers, the method comprising the steps of:
   providing a continuous stream of random binary bits;
   applying a predefined block of said random binary bits to a Hadamard-transform calculation;
   applying the output of said Hadamard-transform calculation to an exponential-frequency calculation (Z) to compute and update an average number of times that the output of said Hadamard transform falls within a predetermined range of values over a predetermined time period; and
   determining whether said generated random binary bits are sufficiently random by comparing the output of said exponential-frequency calculation (Z) to a predetermined acceptance range;
   wherein said exponential-frequency calculation (Z) is counted according to the following equation: $Z_{new} = \alpha \cdot Z_{old} + h(t)$, wherein $\alpha$ falls between 0 and 1 ($0 < \alpha < 1$), $Z_{old}$ is initially assigned by an operator; and, h(t) represents the number of times that the output of said Hadamard-transform falls into the corresponding said predetermined range of values during said predetermined time period.

2. The method of claim 1, wherein said exponential-frequency calculation (Z) is performed according to the following steps:
   assigning an array of accumulators having said predetermined range of values to output of said Hadamard-transform calculation; and,
   counting the number of times that the output of each said Hadamard-transform fails in the corresponding said predetermined range of values for said predetermined time period.

3. The method of claim 1, wherein said predetermined acceptance range is obtained through a simulation.

4. The method of claim 1, further comprising the step of determining that said generated random bits are insufficiently random when any output of said exponential-frequency calculation repeatedly falls outside said predetermined acceptance range more than a predefined number of times.

5. The method of claim 1, further comprising the step of notifying that said generated random bits are insufficiently random when any output of said exponential-frequency calculation repeatedly falls outside said predetermined acceptance range more than a predefined number of times.

6. The method of claim 1, further comprising the step of generating a new set of random bits when any output of said exponential-frequency calculation repeatedly falls outside said predetermined acceptance range more than a predefined number of times.

7. The method of claim 1, further comprising the step of denying said generated random bits for a subsequent application when any output of said exponential frequency calculation repeatedly falls outside said predetermined acceptance range more than a predefined number of times.

8. A method for testing the randomness of a stream of random numbers, the method comprising the steps of:
   (a) generating a continuous stream of random binary bits;
   (b) applying a predefined block of said random binary bits to a Hadamard-transform calculation;
   (c) assigning an array of accumulators having a predetermined range of values to each output of said Hadamard-transform calculation to count a number of times that each output of said Hadamard-transform calculation falls into one of said predetermined range of values in the respective said accumulator;
   (d) applying the values of said array of accumulators to an exponential-frequency calculation (Z) to update the average number of times that each output of said Hadamard-transform calculation falls into one of said predetermined range of values in the respective said accumulator over a predetermined time period; and,
   (e) comparing the output of said exponential-frequency calculation (Z) to a predetermined acceptance range;
   wherein said exponential-frequency calculation (Z) is updated according to the following equation: $Z_{new} = \alpha \cdot Z_{old} + h(t)$, wherein $\alpha$ falls between 0 and 1 ($0 < \alpha < 1$), $Z_{old}$ is initially assigned by an operator; and, h(t) represents the number of times that the output of said Hadamard-transform falls into the corresponding said predetermined range of values in the respective said accumulator.

9. The method of claim 8, wherein said predetermined acceptance range is obtained through a simulation.

10. The method of claim 8, further comprising the step of determining that said generated random bits are insufficiently random when any output of said exponential-frequency calculation repeatedly falls outside said predetermined acceptance range more than a predefined number of times.

11. The method of claim 8, further comprising the step of: if each said exponential-frequency calculation falls inside said predetermined acceptance range, repeating said steps (a)–(e) until at least one of said exponential-frequency calculation outputs fails outside said predetermined acceptance range.

12. The method of claim 11, further comprising the step of notifying that insufficiently random numbers are generated when said steps (a)–(e) are repeated more than a predefined number of times.

13. The method of claim 11, further comprising the step of generating a new set of random numbers when said steps (a)–(e) are repeated more than a predefined number of times.

14. A system for testing randomness, comprising:
a random-number generator for generating a random sequence comprising binary bits;
a detector for detecting whether said generated random sequence is sufficiently random based on an exponential frequency operation; and,
a switch for controlling the flow of said generated random sequences for a subsequent application based on the outcome of said exponential-frequency operation,
wherein a predefined block of said random binary bits undergoes a Hadamard-transform calculation and thereafter undergoes an exponential frequency calculation (Z) to update an average number of times that each output of said Hadamard-transform calculation falls into one of predetermined range of values over a predetermined time period and wherein, if any output of said exponential-frequency calculation outputs repeatedly falls outside a predetermined acceptance range more than a predefined number of times, determining that said generated random sequences are insufficiently random; and wherein said exponential-frequency calculation (Z) is counted according to the following equation: $Z_{new} = \alpha \cdot Z_{old} + h(t)$, wherein a falls between 0 and 1 ($0 < \alpha < 1$), $Z_{old}$ is initially assigned by an operator; and, h(t) represents the number of times that the output of said Hadamard-transform falls into the corresponding said predetermined range of values during said predetermined time period.

15. The apparatus of claim 14, further comprising means for transmitting an alarm signal that said generated random sequences are insufficiently random when any output of said exponential-frequency calculation outputs repeatedly falls outside said predetermined acceptance range more than said predefined number of times.

16. The method of claim 14, further comprising means for generating a new set of random bits when any output of said exponential-frequency calculation outputs repeatedly falls outside said predetermined acceptance range more than said predefined number of times.

17. A machine-readable medium having stored thereon data representing sequences of instructions, and the sequences of instructions which, when executed by a processor, cause the processor to: process a continuous stream of random binary bits; apply a predefined block of said random binary bits to a Hadamard-transform calculation; perform an exponential-frequency calculation (Z) to the output of said Hadamard-transform calculation to update an average number of times that each said Hadamard-transform output falls into one of predetermined range of values over a predetermined time period; and, determine whether said generated random binary bits are sufficiently random by comparing the output of said exponential-frequency calculation to a predetermined acceptance range;
wherein said exponential-frequency calculation (Z) is undated according to the following equation: $Z_{new} = \alpha \cdot Z_{old} + h(t)$, wherein $\alpha$ falls between 0 and 1 ($0 < \alpha < 1$), $Z_{old}$ is initially assigned by an operator; and, h(t) represents the number of times that each output of said Hadamard-transform falls into the corresponding range of values during said predetermined time period.

18. The machine-readable medium of clam 17, wherein said predetermined acceptance range is obtained through a simulation.

19. The machine-readable medium of claim 17, wherein the processor is further operative to determine that said generated random bits are insufficiently random when any output of said exponential-frequency calculation repeatedly falls outside said predetermined acceptance range.

20. The machine-readable medium of claim 17, wherein the processor is further operative to notify that said generated random bits are insufficiently random when any output of said exponential frequency calculation repeatedly falls outside said predetermined acceptance range.

21. The machine-readable medium of claim 17, wherein the processor is further operative to process a new set of random bits when any output of said exponential frequency calculation repeatedly falls outside said predetermined acceptance range more than a predefined number of times.

22. The machine-readable medium of claim 17, wherein the processor is further operative to deny said generated random bits for a subsequent application when any output of said exponential frequency calculation repeatedly falls outside said predetermined acceptance range.

\* \* \* \* \*